United States Patent [19]

Fukunaga et al.

[11] Patent Number: 4,481,573
[45] Date of Patent: Nov. 6, 1984

[54] SHARED VIRTUAL ADDRESS TRANSLATION UNIT FOR A MULTIPROCESSOR SYSTEM

[75] Inventors: Yasushi Fukunaga, Hitachi; Tadaaki Bandoh, Ibaraki; Hidekazu Matsumoto, Hitachi; Ryosei Hiraoka, Hitachi; Jushi Ide, Mito; Takeshi Kato, Hitachi; Tetsuya Kawakami, Hitachi, all of Japan

[73] Assignees: Hitachi, Ltd., Tokyo, Japan; Hitachi Engineering Co., Ltd., Ibaraki, Japan

[21] Appl. No.: 320,934

[22] Filed: Nov. 13, 1981

[30] Foreign Application Priority Data

Nov. 17, 1980 [JP] Japan ............... 55-160758
Oct. 2, 1981 [JP] Japan ............... 56-156193

[51] Int. Cl.³ .................................... G06F 13/00
[52] U.S. Cl. ........................................... 364/200
[58] Field of Search ........................ 364/200, 900

[56] References Cited

U.S. PATENT DOCUMENTS

| | | |
|---|---|---|
| 3,761,881 | 9/1973 | Anderson et al. ............ 364/200 |
| 3,829,840 | 8/1974 | Burk et al. ................... 364/200 |
| 4,084,225 | 4/1978 | Anderson et al. ............ 364/200 |
| 4,155,119 | 5/1979 | DeWard et al. .............. 364/200 |
| 4,277,826 | 7/1981 | Collins et al. ................ 364/200 |
| 4,332,010 | 5/1982 | Messina et al. .............. 364/200 |
| 4,354,225 | 10/1982 | Frieder et al. ................ 364/200 |
| 4,394,731 | 7/1983 | Flusche et al. ............... 364/200 |

Primary Examiner—James D. Thomas
Assistant Examiner—Mark P. Watson
Attorney, Agent, or Firm—Antonelli, Terry & Wands

[57] ABSTRACT

A virtual storage data processing system having an address translation unit shared by a plurality of processors, located in a memory control unit connected to a main memory is disclosed. One of the plurality of processors is a job processor which accesses the main memory with a virtual address to execute an instruction and includes a cache memory which is accessed with a virtual address. One of the plurality of processors is a file processor which accesses the main memory with a virtual address to transfer data between the main memory and an external memory. The cache memory receives the virtual address when the file processor writes to the main memory and if it contains a data block corresponding to the virtual address, it invalidates the corresponding data block. The address translation unit translates the address differently for the access from the file processor and the accesses from other processors.

9 Claims, 22 Drawing Figures

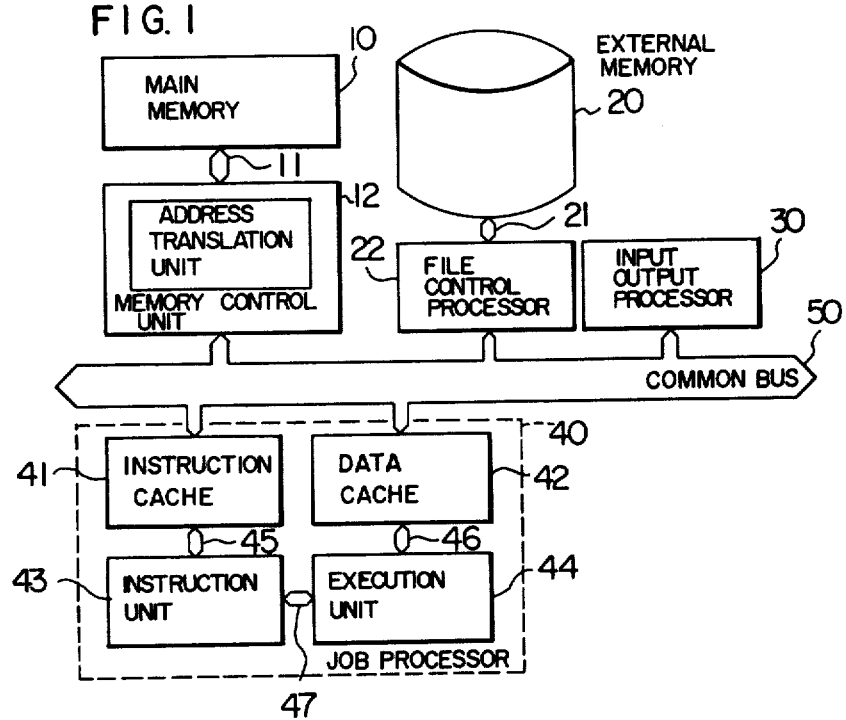
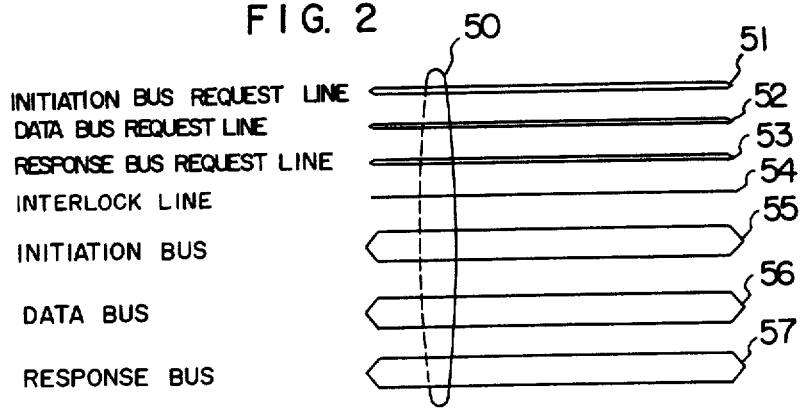

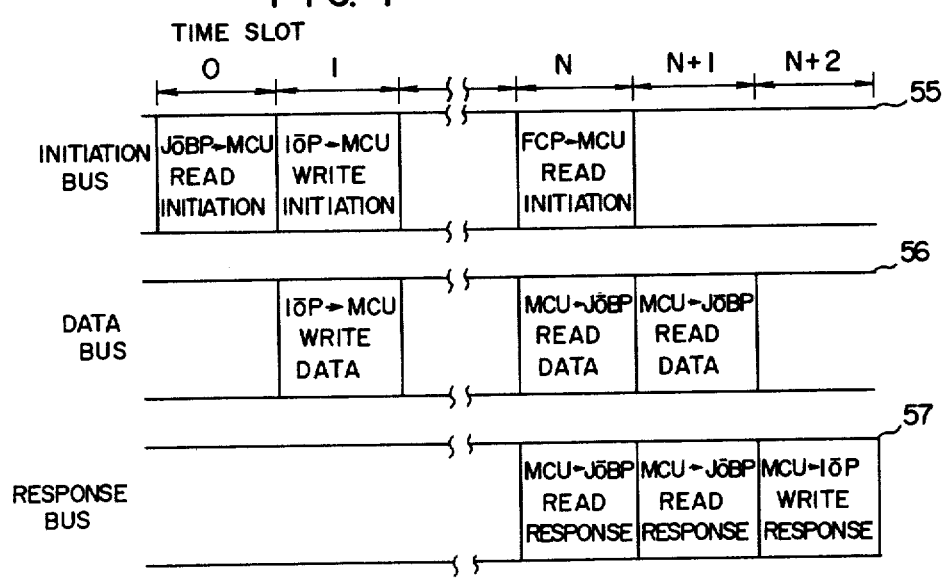

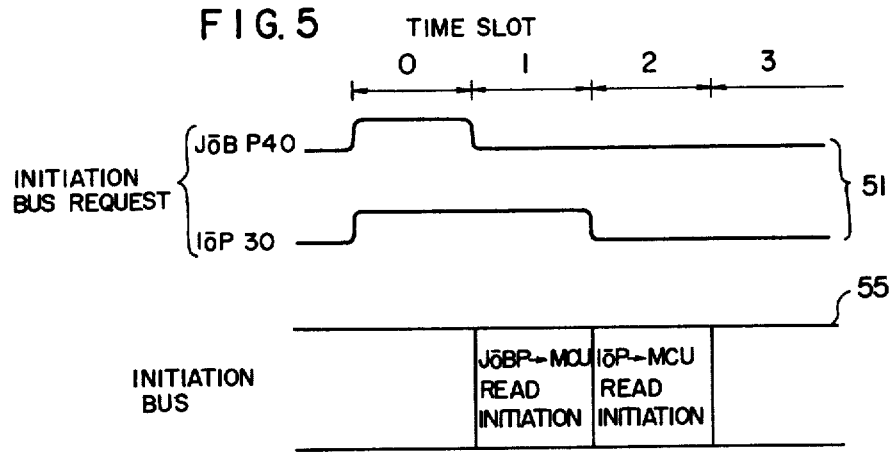
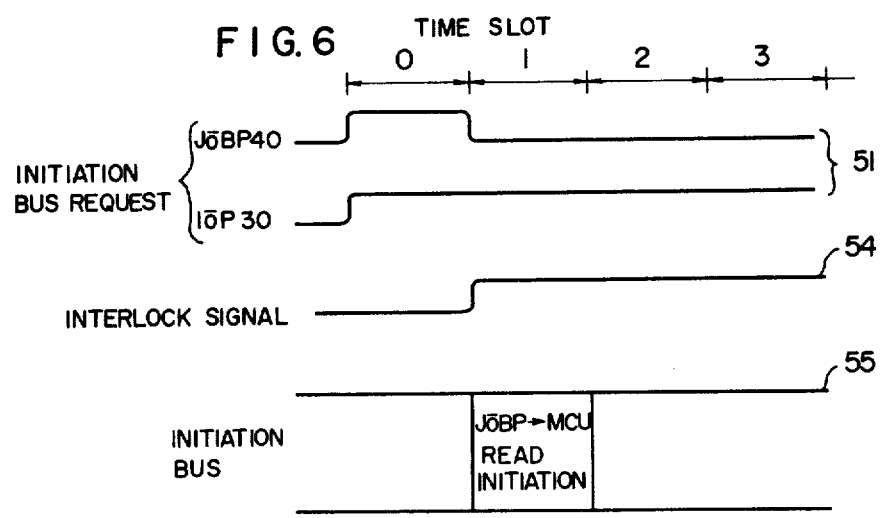

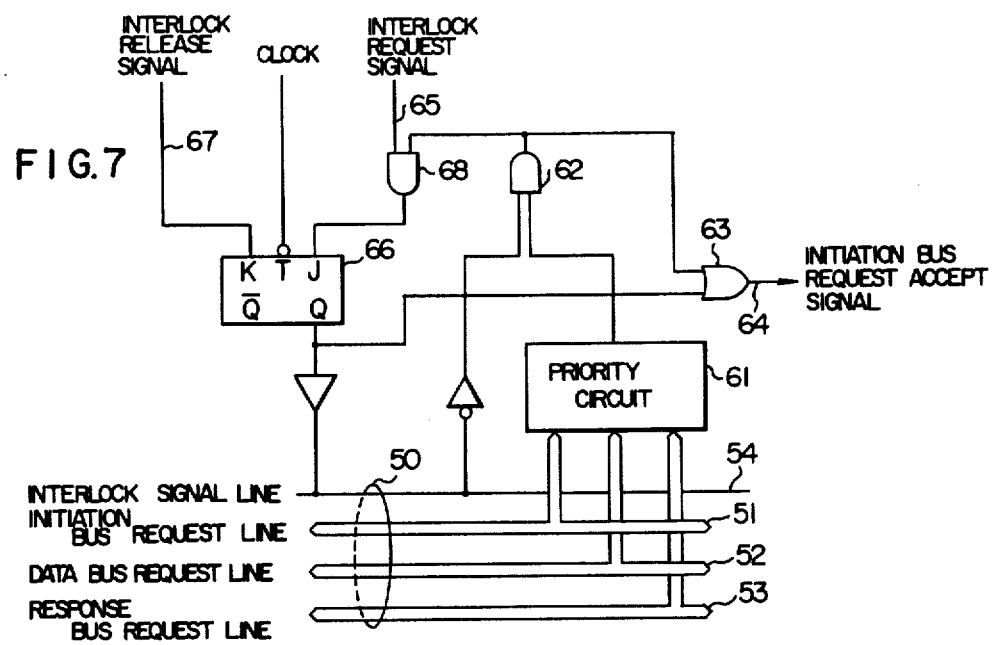

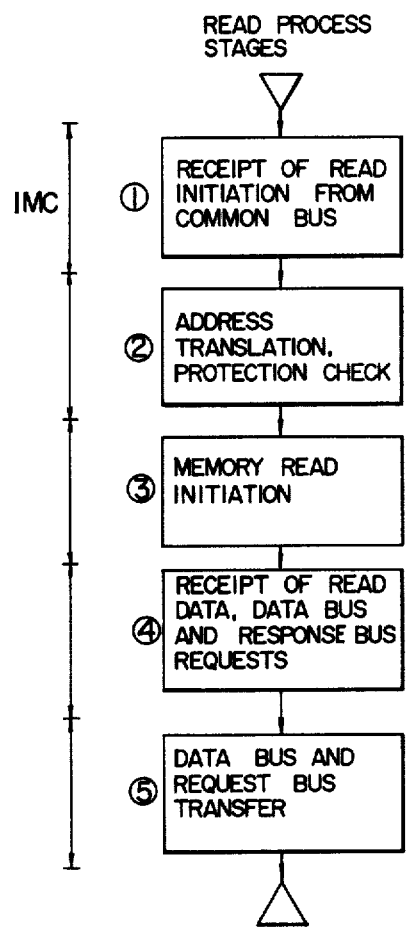
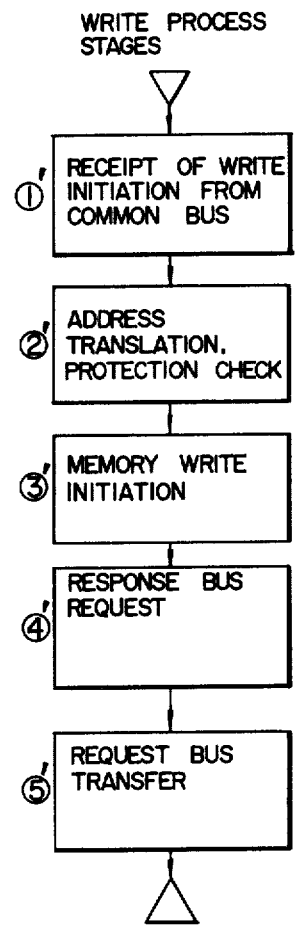
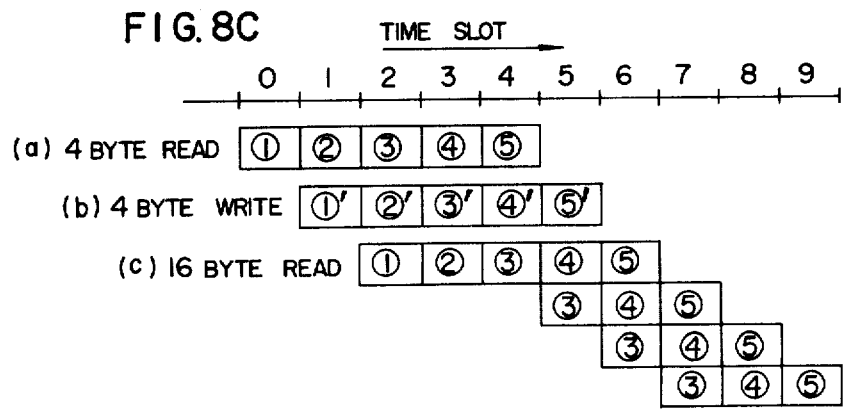

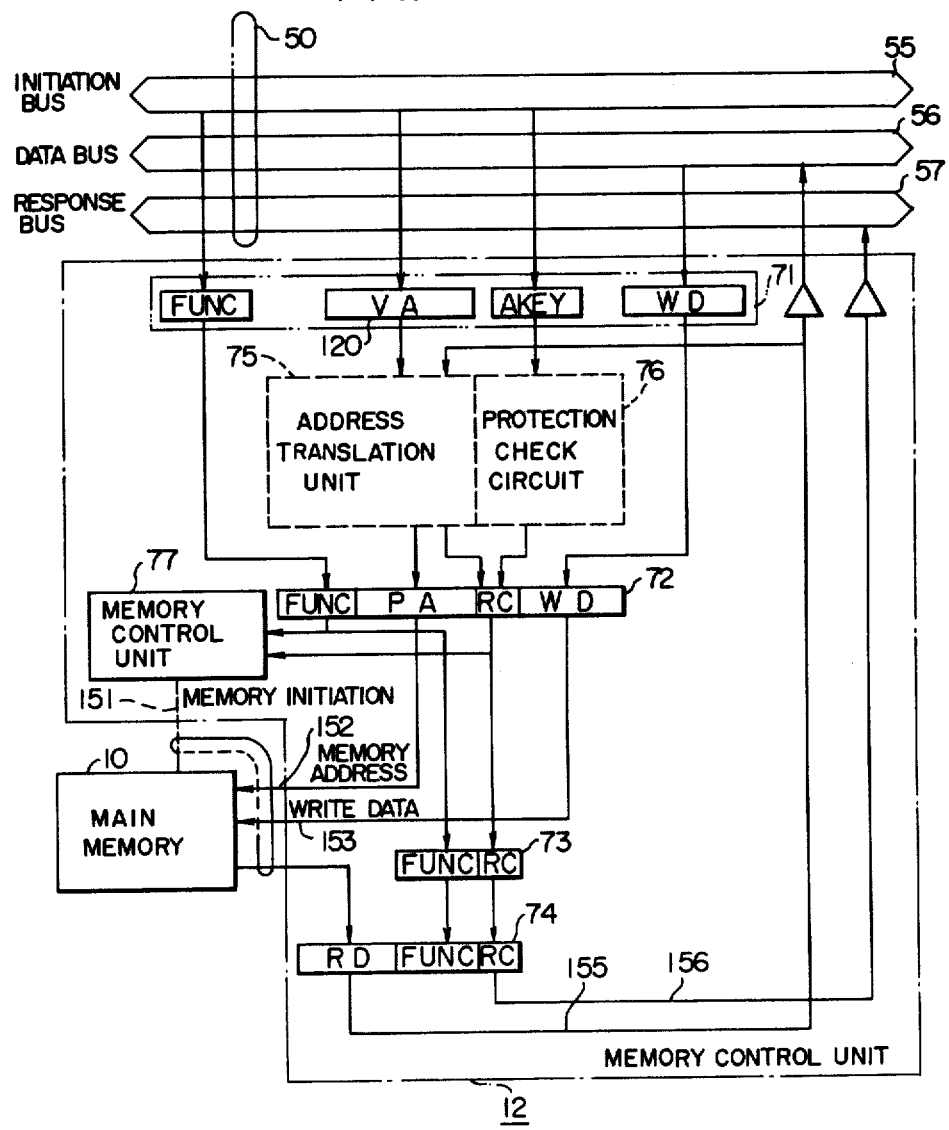

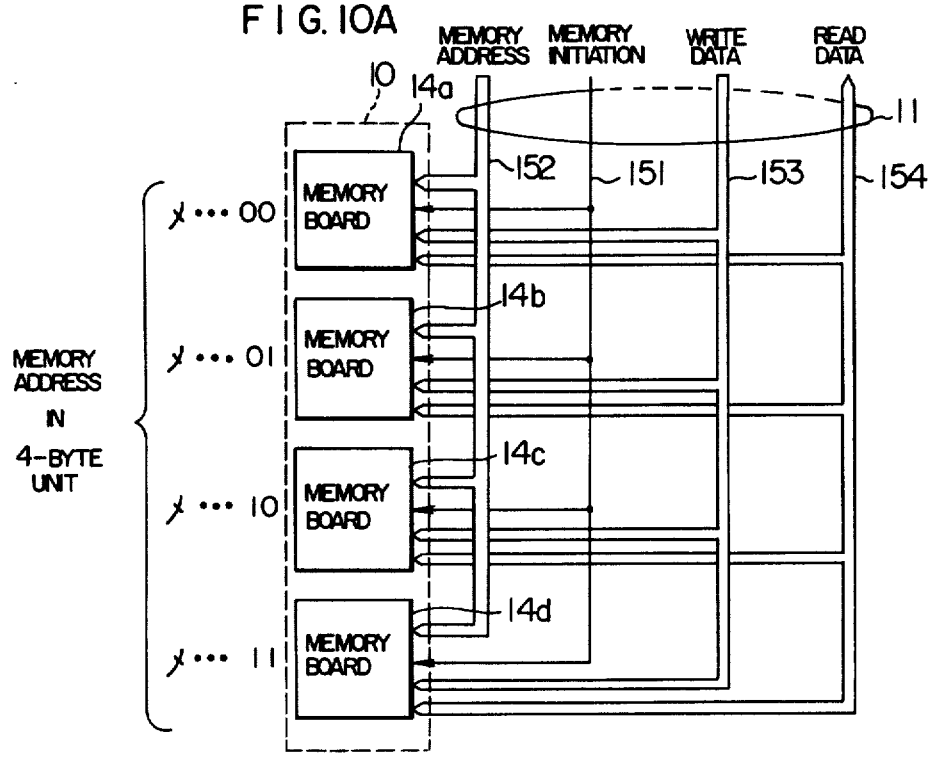

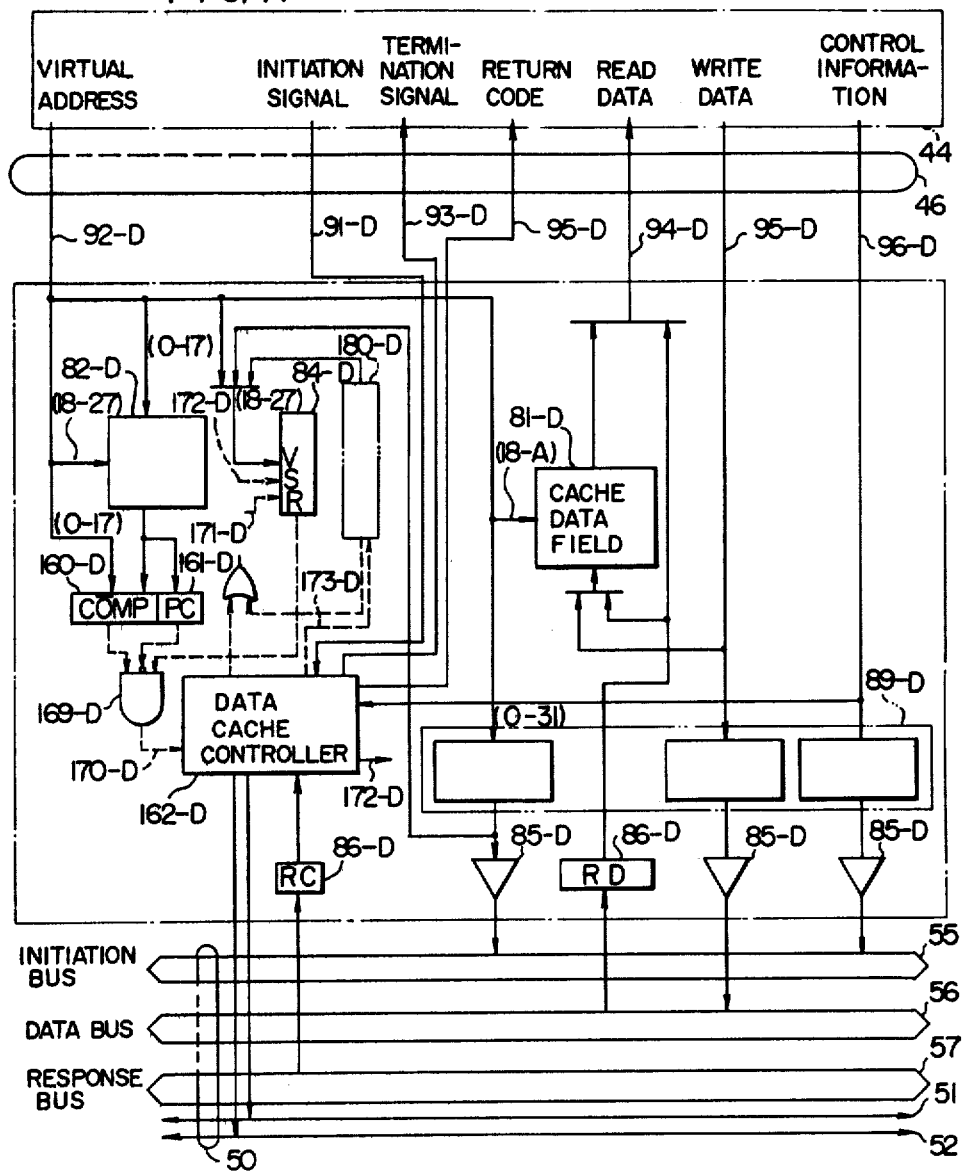

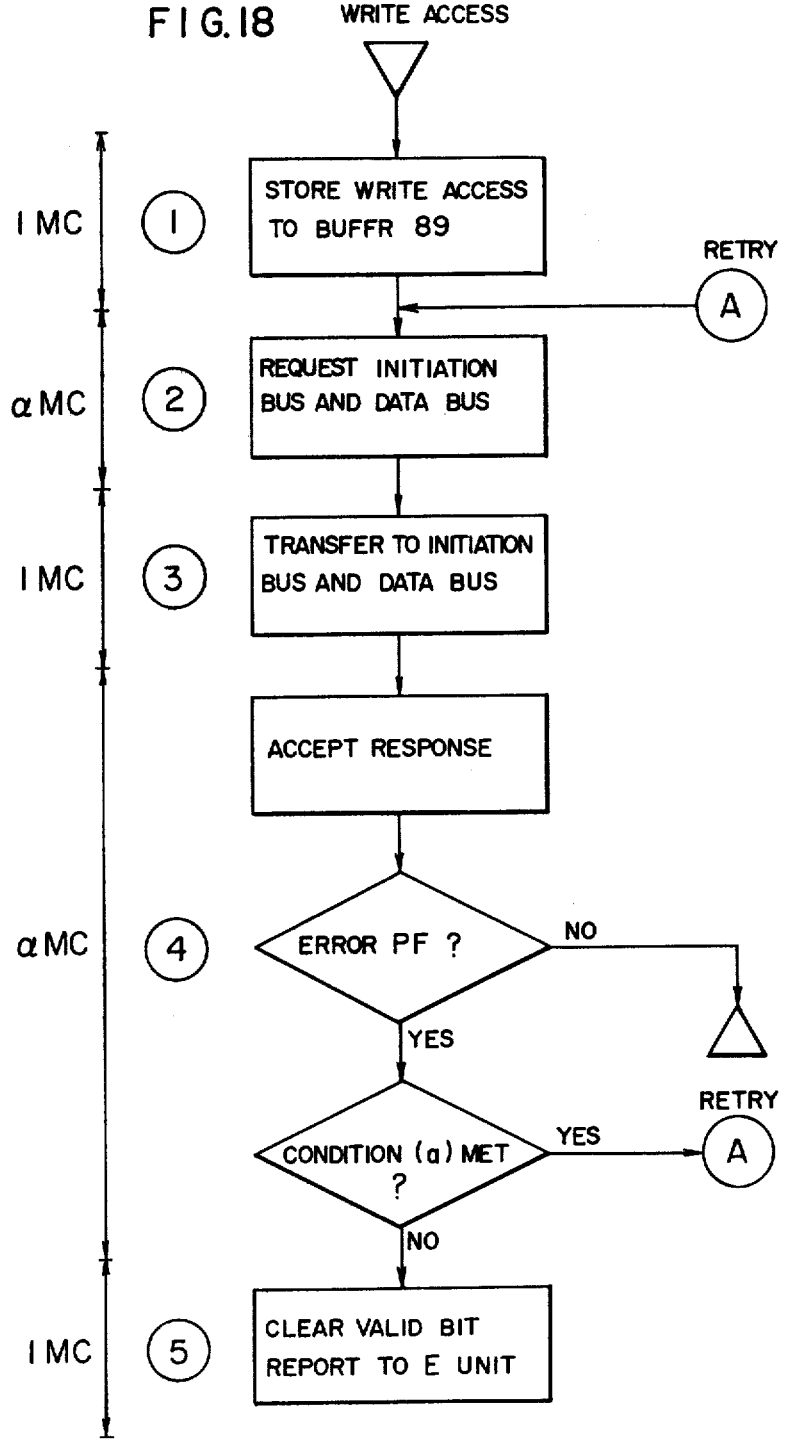

SHARED VIRTUAL ADDRESS TRANSLATION UNIT FOR A MULTIPROCESSOR SYSTEM

The present invention relates to a virtual memory data processing system having an address translation unit shared by a plurality of processors in a memory control unit connected to a main memory. More particularly, at least one of the plurality of processors is a job processor which accesses the memory with a virtual address to execute instructions and which has at least one cache memory which is accessed with the virtual address. At least one of the plurality of processors is a processor herein called a file processor which accesses the memory with the virtual address to read from and write in an external memory which is also called an auxiliary memory.

A data processing system in which a main memory is shared by a plurality of processors is generally called a multiprocessor system.

One of the problems to be resolved in the multiprocessing system is a virtual memory system. The virtual memory system has been known well (for example, by U.S. Pat. No. 3,829,840 issued on Aug. 13, 1974). In the virtual memory system, a main memory and an external memory are regarded to be apparently integral, and when information requested by a processor is not in the main memory but in the external memory, the system automatically transfers a portion of information in the main memory which is less frequently used to the external memory and transfers the requested information from the external memory to the main memory.

The transfer of information from the main memory to the external memory is called a roll-out and the transfer of information from the external memory to the main memory is called a roll-in.

In order to control the roll-in and the roll-out of information in such a system, the main memory and the external memory are usually divided into units called pages, respectively.

Information indicating whether the respective pages are currently in the main memory and corresponding physical addresses (which are also called real addresses) on the main memory if the pages are in the main memory is stored in a translation table for each of the pages.

An address for the memory access by the processor is given by a virtual address, a high order address field of which is used to look up the translation table to effect the translation to the physical address.

Since as many such translation tables as the number of pages of the virtual addresses are required, a large memory capacity is necessary. Accordingly, in order to reduce the necessary memory capacity, the translation table, in many cases, comprises a segment table and a page table to effect two-level address translation.

Since the translation tables require a large memory capacity as described above, they are usually put on the main memory. If the translation tables on the main memory are checked each time the processor requests a memory access, three or more memory accesses take place for each memory access request and the overhead for such operations is not negligible.

Accordingly, many virtual memory processors include high speed buffers called translation lookaside buffers (TLB) which store the physical address corresponding to the recently used virtual addresses.

In such a system, if the processor requests a memory access, the presence or absence of the corresponding address in the TLB is first checked, and if it is present the memory access to the translation table for the address translation is not necessary and the memory access is effected with less overhead for the address translation. In the prior art system, the address translation units with the TLB's are provided one for each of the processors and the virtual memory system is attained with the aid of the control units in the processors.

On the other hand, in order to enhance the performance, each of the processors is usually provided with a high speed memory called a cache memory. The cache memory stores a copy of a portion of the content of the main memory and it usually has a speed which is 5-10 times as fast as the speed of the main memory.

When the processor requests a memory access, the cache memory is first examined to see if it stores the requested data or not, and if it does, the data is sent to the processor; and if it does not, the main memory is accessed.

In the prior art virtual memory system having a cache memory, the TLB, the cache memory and the main memory are connected to the processor in this order as viewed from the processor. This is based on the consideration that the cache memory is a copy of a portion of the main memory. Thus, the cache memory has to be accessed after the virtual address has been translated to the physical address.

Those prior art systems have the following difficulties.

Firstly, the effective memory access time is long.

This is because the access to the cache memory by the processor must pass through the TLB. In other words, the cache memory is accessed after the virtual address from the processor has been translated to the physical address by the TLB.

Secondly, since a TLB is required by each of the processors, the hardware increases as the number of processors increases and the offsets of the TLB's must be compensated, which is a complicated job.

In order to compensate the offsets of the TLB's, when one of the processors swaps a page, the entries to the translation table and to the TLB are updated and it is reported to that processor as well as other processors to clear the corresponding portions.

This is usually called a TLB purge which is one of the important points in constructing the multiprocessor system.

Thirdly, a conventional job processor uses a virtual address to access the memory, but an I/O processor accesses the memory with the physical address because it has no TLB. As a result, when an address is exchanged between those processors the overhead increases.

Fourthly, in a highly pipelined controlled processor, a unit for accessing an instruction is separate from a unit for accessing an operand and they have cache memories of their own to attain high speed operation. In a prior art system of this type, each unit must have a TLB and hence the hardware increases.

In order to resolve the above difficulties, it has been taught in the above-referenced U.S. Pat. No. 3,829,840 to access the cache memory with the virtual address and translate the address only if it does not hit. In this system, it is not necessary to translate the address at every access to the cache memory and hence a high speed operation can be attained.

However, it is pointed out in the U.S. Pat. No. 3,829,840 that this system cannot be adopted for certain applications because of the following disadvantages:

(1) The system does not work satisfactorily when two different virtual addresses refer to the same physical address. This is because, when the content of a virtual address is updated the content of the cache memory specified by another virtual address indicating the same physical address must have been updated.

(2) When the content of a page of the segment table is updated, a scan is required to invalidate the cache memory.

(3) Since storage protection keys are associated with the physical addresses, a protection check is impossible.

Japanese patent application laid-open No. 38649/1981 laid-open on Apr. 13, 1981 also discloses a technique to access the cache memory with the virtual address, but it does not discuss the solution to the above problems.

Japanese patent application laid-open No. 65439/1979 laid-open May 26, 1979 discloses a system to share an address translation unit with a plurality of processors. In this system, because of sharing the address translation unit with the plurality of processors, a multiprocessor system can be economically constructed. However, it does not show the cache memory and does not point out the above-mentioned problems, nor does it suggest a solution thereto.

The present invention is applicable to a configuration having a plurality of processors at least one of which has a cache memory accessed with a virtual address, and an address translation unit shared by all of the processors.

The most difficult problem in this system is, as pointed out in the U.S. Pat. No. 3,829,840, that when a page or segment table of a main memory is updated, such fact is not conveyed to the cache memory and hence the content of the cache memory does not exactly reflect the content of the main memory.

In addition, since the address translation unit is shared by the plurality of processors, when a real address corresponding to a requested virtual address is not in the main memory, that is, when a page fault occurs, the corresponding page has to be transferred to the main memory from an external memory. This transfer is controlled by a file processor. During the transfer, that is, during the paging, the paging area must be prevented from being accessed by the processors other than the file processor.

Furthermore, since the address translation unit is shared by the plurality of processors, the address translation unit is a bottleneck to throughput as the number of processors increases.

It is, therefore, an object of the present invention to provide a data processing system having an address translation unit of reduced complexity and which requires reduced effective memory access time to resolve the problems of the cache memory.

It is another object of the present invention to provide a data processing system which allows the page processor to carry out a paging operation without difficulty when a page fault occurs.

It is a further object of the present invention to provide a data processing system having a high speed memory controller including an address translation unit to prevent a reduction of the throughput to and from the main memory.

The cache memory used in the present invention includes invalidating means which receives a virtual address when the file processor writes to the main memory and, when a data block corresponding to the virtual address is retained in the cache memory, inhibits the use of that data block.

The address translation unit used in the present invention discriminates the access by the file processor and the accesses by other processors.

The memory controller used in the present invention comprises a first register for latching the virtual address sent from the processor and a second register for retaining the translated physical address to be used as the address when the main memory is accessed, and sequentially and parallelly carries out the loading of the virtual address sent from the processor to the first register, the address translation of the content of the first register and the loading of the translated address to the second register, and the accessing of the main memory by the content of the second register.

The present invention is pointed out particularly in the appended claims. The above and other objects and advantages of the present invention will be better understood by referring to the following description taken in conjunction with the accompanying drawings, in which:

FIG. 1 shows an overall configuration of a data processing system to which the present invention is applied;

FIG. 2 shows a configuration of a common bus shown in FIG. 1;

FIG. 3 shows a chart for illustrating particular portions of the common bus used for respective access operations;

FIG. 4 illustrates the use of the common bus;

FIG. 5 illustrates occupation control of the common bus;

FIG. 6 illustrates occupation control of the common bus when an interlock signal is present;

FIG. 7 shows a configuration of an occupation control circuit;

FIGS. 8A to 8C show process flow in an MCU and illustrate overlapped process of a plurality of access requests in the MCU;

FIG. 9 shows a configuration of the MCU;

FIGS. 10A and 10B show a configuration of a memory board and illustrate a sequence of data sendback for 16-byte read;

FIG. 17 shows a configuration of a data cache; and

FIG. 18 illustrates process flow for write acess.

Figure 11:
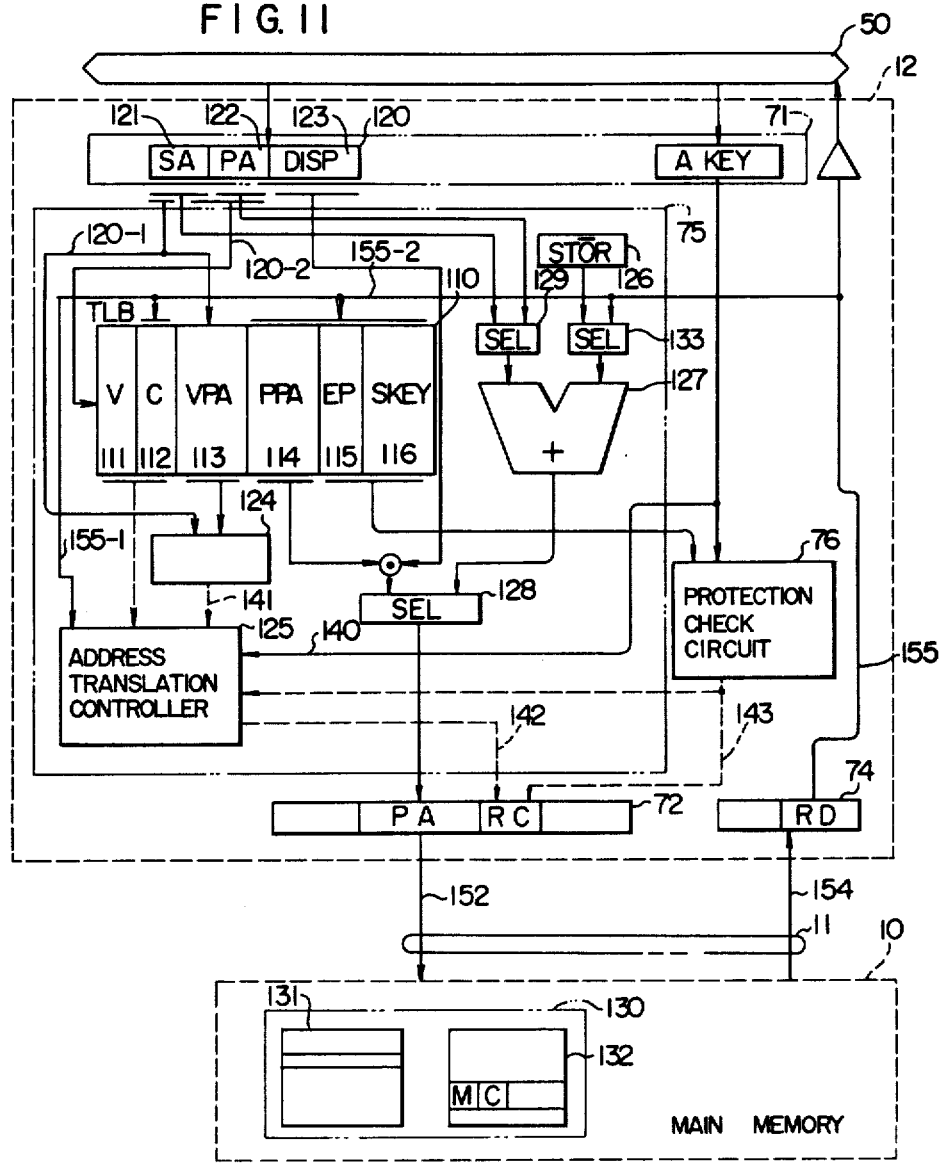
FIG. 11 shows an address translation unit having a TLB.

The methods, according to the invention, of resolving the problems pointed out in the U.S. Pat. No. 3,829,840 will be first discussed.

The first problem is that two virtual addresses cannot specify the same physical address. This requirement occurs in a multi-virtual memory system. For example, the requirement occurs when the number of bits for specifying an address is small, such as 24 bits, and hence the size of the virtual space is not sufficiently large ($2^{24}=16M$ bits). If a large virtual space such as $2^{32}=4G$ bits or $2^{48}=256T$ bits can be supported, such a multi-virtual memory system will become unnecessary. A common sub-routine or accessing of data with different virtual addresses is not preferable because of the complexity in area control. This problem is not raised in a single virtual memory system in which all programs and data are allotted to unique addresses.

The second problem is an essential problem encountered when the cache is accessed with the virtual address. This will be discussed in further detail. The address translation table is updated when (i) a paging fault occurs during the execution of a program and a requested page is rolled in or a page is rolled out to prepare a vacant area, and (ii) a program generated is allotted to a virtual address or a program is deleted. In such cases, data rolled out of the main memory remains in the cache memory or a previous program remains in the cache memory after a new program has been generated. With respect to the fact that the rolled-out information remains in the cache, if the cache memory is considered as a cache in a space including the external memory, no problem will be encountered by reading out the rolled-out information.

On the contrary, this may be an advantage of the present system because the memory capacity of the main memory increases by the memory capacity of the cache. In a store-through cache memory, the cache and the main memory are both updated for each write access to the main memory. Accordingly, every address passes through the address translation unit which checks if the corresponding page is on the main memory or not. Accordingly, in a program executed using the rolled-out page, the program continues to run so far as a cache hit occurs, and when a cache miss or write request to the main memory occurs, a page fault takes place. The requested page is (a) on the main memory, (b) being paged, or (c) not on the main memory. An ordinary processor can access the main memory only in the condition (a) and the file processor which transfers data to and from the external memory can access even in the condition (b). The address translation unit checks if the above rule is met.

When a page fault takes place, the corresponding block in the cache memory is invalidated and no cache hit occurs thereafter. If the page fault takes place in the read access, the corresponding block is prevented from being written to the cache.

When a currently executed program is terminated and a new program is generated at the same virtual address, it is usually transferred from the external memory. In this case, means for invalidating the cache during the transfer from the external memory may be provided. More particularly, the transfer from the external memory to the main memory is effected by the virtual address and the cache memory monitors the address, and if the corresponding block is present in the cache memory it is invalidated.

The third problem is that of storage protection. The virtual address can allocate a unique storage protection key to each program better than the physical address. The write protection key must be checked because the write address always passes through the address translation unit. When a write protection error is detected, the corresponding block in the cache memory is invalidated to prevent the data written in the cache memory from being used. Consideration will become necessary with respect to the execution protection because if a requested data for memory read is in the cache the read request is sent back and not supplied to the address translation unit. In the present invention, the cache memory is divided into an instruction cache and a data cache and the read request is not supplied to the cache memory if an execution protection error is detected.

Referring to FIG. 1, numeral 10 denotes a main memory for storing programs and data, and it is connected to a common bus 50 through a memory bus 11 and a memory control unit (MCU) 13.

Numeral 20 denotes an external memory which stores programs and data to be transferred to the main memory 10, and it is connected to the common bus 50 through an external memory bus 21 and a file control processor (FCP) 22. Numeral 30 denotes an I/O processor (IOP) which controls data transfer between various I/O devices not shown.

Numeral 40 denotes a job processor (JOBP), only one being shown in FIG. 1. It executes a program (instructions).

The job processor 40 comprises an instruction cache 41, a data cache 42, an instruction (I) unit 43 and an execution (E) unit 44. The instruction cache 41 and the I unit are interconnected through a bus 45, and the data cache 42 and the E unit 44 are interconnected through a bus 46. The I unit 43 and the E unit 44 are interconnected through a bus 47.

The file processor 22, the I/O processor 30 and the job processor 40 are connected to the common bus 50 and can access the main memory 10 through the memory control unit 12.

The job processor 40 processes data in a pipelined fashion with the I unit 43 and the E unit 44 and has the instruction cache 41 and the data cache 42 for the respective units.

The data handled by the program (instructions) are also called operands and the data cache is also called an operand cache.

When the I unit 43 fetches an instruction word to be executed, the presence or absence of the instruction word on the instruction cache 41 is checked, and if it is present the data is transferred to the I unit 43 as the instruction word through the bus 45. If it is absent, a virtual address of the instruction word is transferred to the memory control unit 12 through the common bus 50.

The memory control unit 12 translates the virtual address to the physical address to access the main memory 10 through the memory bus 11. The accessed data (instruction) is sent to the instruction cache 41 through the common bus 50 and to the I unit 43 through the bus 45, is processed in the I unit 43 and stored in the instruction cache 41.

The I unit 43 decodes the fetched instruction to indicate "what is to be done" to the E unit 44. Based on the instructions, the E unit 44 collects necessary data from internal registers and the data cache 42 (or from the main memory 10 if the data is not on the data cache 42), processes the data and loads the result in the internal register or the main memory 10. When the result is to be stored in the main memory 10, if the data at the corresponding location has been stored in the data cache 42, that data is updated.

An exemplary configuration of the common bus 50 is now explained. As shown in FIG. 2, the common bus 50 comprises an initiation bus 55, a data bus 56 and a response bus 57 which are used to actually transfer information, and an initiation bus request line 51, a data bus request line 52, a response bus request line 53 and an interlock signal line 54 which are used to allocate the buses 55 to 57 to the processors and the memory control unit. Those buses and lines are used in a time division fashion.

The buses 55 to 57 carry the following information.
(1) Initiation bus 55:
  (a) Address
  (b) Type of access (for example, read access, write access, and the number of bytes to be accessed)
  (c) Access key (used in the protection check in the MCU 12)
(2) Data bus 56:
  (a) Write data
  (b) Read data
(3) Response bus 57:
  (a) End signal
  (b) Return code (information concerning an error and page fault occurred during the access)

FIG. 3 illustrates a manner in which the buses 55 to 57 are used. As shown in FIG. 3, three combinations are available;
  (i) read request a and read response b,
  (ii) read request a and write response d, and
  (iii) write request c and write response d can be transferred simultaneously in the same time slot.

Referring to FIG. 4, the manner in which the buses 55 to 57 are used is further explained. In a time slot 0, JOBP issues a memory read initiation signal to MCU and corresponding read data is sent back in time slots N and N+1. In a time slot 1, IOP issues a memory write initiation signal to MCU and corresponding data is sent back in a time slot N+2. The initiation signals and the responses are transferred in a split transfer fashion over the common bus 50. The main memory 10 is designed to allow multiple memory accesses.

Before the transfer through the buses 55 to 57, the occupation control must be performed. This is effected by issuing requests 51 to 53 from the processors and the memory control unit which desire the transfer to the desired buses one time slot before the transfer and granting the transfers with a priority order. The priority order may be given in various ways although detail thereof is not explained here. The response bus request has a higher priority than the initiation bus request because if the send-back of the response is prevented by the initiation bus request, the initiation process in the memory control unit is interrupted resulting in a deadlock condition. In the present embodiment, if the request for the data read response b in FIG. 3 and the request for the data write initiation c compete, the former is given a higher priority.

FIG. 5 shows an example of the occupation control. In the time slot 0, the JOBP 40 and the IOP 30 issue the initiation bus requests 51 in order to initiate the read operation. Assuming that the JOBP 40 has a higher priority than the IOP 30, the JOBP 40 uses the initiation bus 55 in the time slot 1 to initiate the read operation and withdraws the occupation request. On the other hand, since the occupation request of the IOP 30 was not accepted, the IOP 30 continues to issue the initiation bus request 51 in the time slot 1. After the occupation request by the JOBP 40 has been withdrawn in the time slot 1, the IOP 30 is allowed to initiate the read operation in the time slot 2.

In such a system, when one of the processors accesses the main memory 10 while rejecting the accesses from other processors, that is, in the interlocked mode, the use of the initiation bus 55 by other processors is prevented. By the occupation of the initiation bus 55, the subsequent initiation bus requests which may be issued from other processors are rejected, and a response to the memory initiation being processed in the main memory can be sent back through the data bus 56 and the response bus 57. If the response is not sent back, the initiation process in the memory control unit 12 is interrupted resulting in a deadlock condition.

One example of occupation of the initiation bus 55 is now explained. When the processor attempts to access the memory controller 12 in the interlock mode, the initiation bus request 51 is accepted as shown in FIG. 6 and the processor issues the interlock signal 54 indicating the occupation of the initiation bus 55, in the time slot in which information is transferred out to the initiation bus 55. This interlock signal prevents the initiation bus requests 51 from other processors from being accepted. This may be done by a circuit shown in FIG. 7. Each processor has a separate priority circuit 61 for the occupation requests 51 to 53. The interlock signal line 54 is an open collector line. When the interlock signal 54 is not present, the occupation requests 51 to 53 are examined by the priority circuit 61, and if the initiation bus request 51 has the highest priority, an accept signal 64 for the occupation of the initiation bus 55 is issued through an AND gate 62 and an OR gate 63. Accordingly, the processor is allowed to transfer out information to the initiation bus in the next time slot. If an interlock request signal 65 is being issued from the processor at this time, a J-K flip-flop 66 is set through an AND gate 68 and an interlock signal 54 is produced. The interlock signal 54 lasts until an interlock release signal 67 is issued and the processor continuously occupies the initiation bus 55 during this period. When the interlock signal is issued from another processor, the output of the priority circuit 61 is inhibited by blocking of the AND gate 62 so that the initiation bus request accept signal 64 is not produced. As a result, the processor cannot use the initiation bus 55 and cannot initiate the memory.

The MCU 12 is now explained. The MCU 12 carries out ordinary memory access processing as well as the address translation from the virtual address to the physical address and the protection check.

Because the MCU 12 is commonly used among the processors and a high throughput is request thereto, the read process and the write process are staged in stages ①-⑤ and ①'-⑤', as shown in FIGS. 8A and 8B, so that a plurality of accesses can be processed in an overlapped or parallel fashion as shown in FIG. 8C.

FIG. 9 shows an exemplary configuration of the MCU 12. The process stages shown in FIGS. 8A and 8B carry out the following operations.

(A) Read process stages:
① Receipt of read initiation from the common bus 50

The virtual address (VA), the type of access (FUN) and the access key (AKEY) on the initiation bus 55 are loaded to a common bus receiving register 71.

② Address translation and protection check
The address translation unit 75 checks if the page specified by the virtual address (VA) is in the main memory 10 or not, and if it is, the address translation unit 75 translates it to the physical address. If it is not in the main memory 10, a page fault takes place.

A protection check circuit 76 checks to see if the access is permitted or not.

The address translation unit 75 and the protection check circuit 76 will be explained in detail hereinlater.

The protection check result and the page fault information as well as other error information, are loaded into an access register 72 as a return code (RC) together with the type of access (FUNC) and the physical address (PA).

③ Memory read initiation

If no error or page fault is present in the access in the access register 72, the memory control unit 77 issues a memory initiation 151 to the main memory 10 at the physical address (PA) on the access register 72, and after the main memory 10 has received the memory initiation, the access register 72 transfers the type of access (FUNC) and the return code (RC) to a temporary store register 73.

If an error or page fault is present in the access in the access register 72, the memory initiation is not issued and the information is transferred to the temporary store register 73.

④ Receipt of the read data and the data and response bus requests

The read data 154 is received from the main memory 10 through the memory bus 11, and the type of access (FUNC) and the return code (RC) are transferred to a common bus send-out register 74.

On the other hand, the data bus request 52 and the response bus request 53 are transferred out to the common bus 50.

⑤ Read data and response bus transfer

After the request 52 or 53 of ④ has been accepted, the read data 154 is transferred to the data bus 56 through a bus 155, and an end signal and the return code (RC) are transferred to the response bus 57 through a bus 156 to send them back to the requesting processor.

(B) Write process stages:

①′ Receipt of write initiation from the common bus 50

The virtual address (VA), the type of access (FUNC), the access key (AKEY) on the initiation bus 55 and the write data (WD) on the data bus 56 are loaded into the common bus receiving register 71.

②′ Address translation and protection check

The same operation as ② of the read process stages (A) for loading of the write data (WD) into the access register 72.

③′ Memory write initiation

The same operation as ③ of the read process stages (A) except for the transfer of the write data (WD) 153 to the main memory 10.

④′ Response bus request

The type of access (FUNC) and the return code (RC) are transferred to the common bus send-out register 74. On the other hand, the response bus request 53 is transferred to the common bus 50.

5 ′ Response bus transfer

After the response bus request 53 of ④′ has been accepted, the end signal and the return code (RC) are transferred to the response bus 57 through the bus 156 to send them back to the requesting processor.

As discussed above, the read and write processes are staged and the stages of different numbers for the different accesses can be processed in parallel as shown in FIG. 8C, in which (a) 4-byte read initiation, (b) 4-byte write initiation and (c) 16-byte read initiation are received from the common bus 50 at the time slots 0, 1 and 2, respectively. Looking at the time slot 2, the memory read operation initiation ③ for (a), the address translation and protection check ②′ for (b) and the receipt of the read initiation from the common bus ① for (c) are carried out in parallel. The 16-byte read (c) repeats the stages ③ to ⑤ four times because of 4-byte memory interleaving. This will be further explained below.

FIGS. 10A and 10B show a configuration of the main memory 10. Memory boards (MB) 14 (14a–14d) have 4-byte data width and the memory boards 14a, 14b, 14c and 14d have data addresses given in four-byte units with the lower two bits thereof being 00, 01, 10 and 11, respectively. A 16-byte data block is divided into 4-byte groups which are stored in the memory boards 14a, 14b, 14c and 14d, respectively. Accordingly, in the 16-byte read operation, the memory boards can be initiated sequentially as shown in FIG. 8C to read out the data without competition among the memory boards 14. The 16-byte read is mainly used in a block transfer to transfer data to the cache memory when a cache miss occurs.

When the I unit 43 or the E unit 44 accesses the instruction cache 41 or the data cache 42, it accesses in a smaller unit (4-byte unit in the illustrated example) than a 16-byte unit. Accordingly, in the 16-byte read, the access is controlled such that the I unit 43 or the E unit 44 receives the requested 4-byte data earlier than the remaining data in order to reduce the access time. To this end, the sequence of initiation of the memory boards 14 by the MCU 12 is changed.

The address translation and the protection check operations are now explained in detail.

Figure 12:
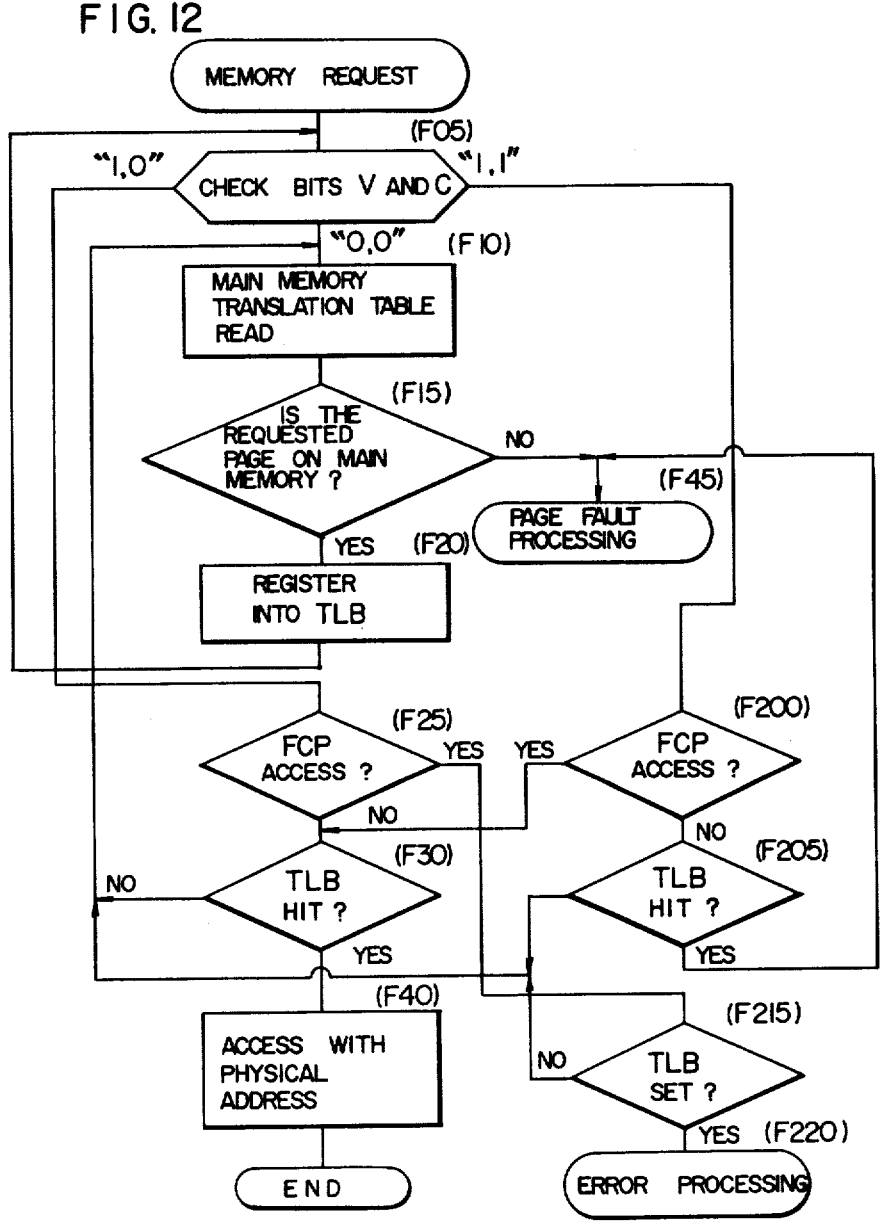
FIG. 12 shows a flow for address translation.

FIG. 11 shows the address translation unit 75 of FIG. 9 and the supporting circuits in detail, and FIG. 12 shows the flow of the address translation operation.

A translation table 130 for effecting translation from the virtual address to the physical address is located in the main memory 10 because of its large memory capacity. Since the virtual address is translated to the physical address at each memory access, the overhead increases if the main memory 10 is accessed. Accordingly, a TLB 110 for storing the translation information of lately accessed addresses is provided in the MCU 12.

The TLB 110 stores the contents of the lately used pages of the address translation table 130 so that high speed address translation is attained. The content of each of the pages in the TLB 110 includes a valid bit (V) 111, a connect bit (C) 112, a portion of the virtual address (VPA) 113, a portion of the physical address (PPA) 114, an execution protection bit (EP) 115 and a storage key (SKEY) 116. The bit V 111 and the bit C 112 indicate the current status of the page. When the bit V 111 is "0", it indicates that the content of the page in the TLB 110 is not valid (invalid).

When both the bit V 111 and the bit C 112 are "1", they indicate that the page is being transferred between the main memory 10 and the external memory 20, that is, paging condition. When the bit V 111 is "1" and and bit C 112 is "0", they indicate that the page is in the main memory 10 and the memory access is permitted.

The paging condition is indicated in order to prevent the paging area from being accessed, except for the paging access from the FCP 22.

In the present system, since the virtual address is translated to a physical address by the MCU 12 commonly to all of the processors, the access to the area being paged by the FCP 22 passes through the common address translation unit 75. If the access to the paging area by another processor is permitted, data may be broken or lost. Accordingly, as described above, when both the bit V 111 and the bit C 112 are "1", only the paging access by the FCP 22 is permitted to avoid the difficulty explained above.

The portion of the virtual address (VPA) 113 is used to check if the translation pair for the corresponding virtual address (VA) has been registered in the TLB 110 when the address is to be translated by the TLB 110, and the portion of the physical address (PPA) 114 is used to prepare the physical address (PA) when the translation pair is in the TLB 110.

The virtual address (VA) includes a segment address (SA) 121, a page address (PA) 122 and a displacement (DISP) 123. The portion of the physical address (PPA) 114 is combined with the displacement (DISP) 123 to produce the physical address (PA).

The execution protection bit (EP) 115 prevents a wrong instruction fetch or execution for data. The execution protect error is detected by the protection check circuit 76 if an instruction is fetched from an area for which the execution protection bit is "1". Where the JOBP 40 has a separate instruction cache 41 and data cache 42 as is the case of the present embodiment, the access to that area from the instruction cache 41 causes an execution protect error.

The storage key (SKEY) 116 is used for the write protection. The protection check circuit 76 checks the storage key (SKEY) 116 and the access key (AKEY) transferred from the requesting processor to determine if the write access is permitted or inhibited, and if it is inhibited the write protection error takes place.

The access key (AKEY) is compared with the storage key (SKEY) 116 to check the write protection error as described above. It also includes information on the paging address from the FCP 22 and the instruction fetch and is used for the protection check of such information.

The translation process is now explained with reference to a flow chart shown in FIG. 12.

The memory access is classified into the following two major categories:

(1) memory access by an ordinary processor, and
(2) memory access during paging by the FCP 22.

The accesses (1) and (2) are discriminated by the access key (AKEY) which is supplied to the address translation controller 125 through the signal line 140.

The address translation and the determination for accepting the access for the memory access (1) will be first explained.

The virtual address from the processor (JOBP 40 or IOP 30) is loaded into a virtual address register 120 in the common bus receiving register 71 in the MCU 12 through the common bus 50. Of the virtual address loaded into the virtual address register 120, a portion 120-2 of the segment address (SA) 121 and the page address (PA) 122 is used to address the TLB 110. The bit V 111 and the bit C 112 of the entry in the TLB 110 addressed by the address 120-2 are supplied to the address translation controller 125. The subsequent process includes one of the following three operations ①-③ depending on a particular pattern. It corresponds to a step F05 in the flow chart of FIG. 12.

① Bit V 111 is "0" and bit C 112 is "0":
This is shown by (0, 0) in FIG. 12. As described above, the corresponding page (entry) on the TLB 110 is invalid and the translation table 130 on the main memory 10 is read out (F10). The operation for a TLB miss will be explained later.

② Bit V 111 is "1" and bit C 112 is "1":
This is shown by (1, 1) in FIG. 12. If the comparator 124 indicates the equality of the portion 120-1 of the virtual address and the portion (VPA) 113 of the virtual address in the TLB 110 and the TLB hit signal 141 is present (F205), it indicates that the corresponding page is currently being paged. Accordingly, the memory access thereto is inhibited and a missing page fault signal 142 is produced by the address translation controller 125 (F45).

When the TLB hit signal is not present, it indicates TLB miss. Accordingly, like in the case of ①, the translation table 130 on the main memory 10 is read out (F10).

③ Bit V 111 is "1" and bit C 112 is "0":
This is indicated by (1, 0) in FIG. 12. The TLB hit signal 141 is first checked (F30), and if it is not present, the protection error signal 143 from the protection check circuit 76 is checked. If no error, the displacement 123 in the virtual address register 120 and the portion 114 of the physical address on the TLB 110 are combined to form a physical address in the access register 72 through a selector 128, and the physical address is transferred to the memory address bus 152, and a memory initiation signal 151 is produced from the memory control unit 77 to access the main memory 10 (F40).

The memory access during paging by the FCP 22 in the category (2) now will be explained.

The virtual address from the FCP 22 is loaded into the virtual address register 120 in the MCU 12 through the common bus 50.

TLB 110 is accessed first in this case, too. The subsequent process is one of the following three depending on a particular pattern of the bit V 111 and the bit C 112 of the accessed entry of the TLB 110.

① Bit V 111 is "0" and bit C 112 is "0":
The translation table 130 on the main memory 10 is read out (F10).

② Bit V 111 is "1" and bit C 112 is "1":
The TLB hit signal 141 is checked (F30). If the TLB hit is indicated, the main memory 10 is accessed with the physical address prepared in the access register 72 (F40).

If the TLB hit signal is not present, the translation table 130 on the main memory 10 is read out (F10).

③ Bit V 111 is "1" and bit C 112 is "0":
The TLB hit signal 141 is checked (F215). If the TLB hit signal 141 is present, it indicates that the inhibited area was accessed, and an error condition is transmitted to the FCP 22 (F220).

The process for reading the translation table 130 on the main memory 10 in the case of a TLB miss now will be explained.

In order to reduce the memory capacity necessary for the translation table 130, the table 130 comprises a page table 132 retaining information necessary for the address translation and a segment table 131 retaining leading addresses of the page table 132. In the case of a TLB miss, the content of a register (STOR) 126 retaining the leading address of the segment table and the segment address (SA) in the virtual address register 120 are combined in an adder 127 to prepare a physical address by which the segment table 131 is addressed to read out the content of the addressed location to the read data bus 155. The data includes the leading address of the page table 132, and this leading address and the page address (PA) 122 in the virtual address register 120 are combined in the adder 127 to produce an address to read out information necessary for the translation from the page table 132 (F10).

The page table 132 contains bits M and information in the TLB 110 excluding the bit V 111 and the portion (VPA) 113 of the virtual address. The bit M and the bit C are supplied to the address translation controller 125 through a portion 155-1 of the read data bus 155. Depending on a particular pattern of those bits, one of the following processes is carried out.

(a) Bit M is "0" and bit C is "0":

It indicates that the corresponding page is not in the main memory 10 but is in the external memory 20. For the access request to that page, a missing page fault signal 142 is produced to provide information concerning the page fault to the processor (F45).

(b) Bit M is "0" and bit C is "1":

It indicates that the corresponding page is currently being paged. For the memory access by the processor other than the FCP 22, the memory access is inhibited and the missing page fault signal 142 is produced (F45). For the memory access by the FCP 22, it is registered in the TLB 110 and the memory is accessed (F20).

(c) Bit M is "1" and bit C is "0":

A portion 155-2 of the read data, the portion 120-1 of the virtual address and the bit V "1" are registered in the TLB 110 (F20), and the bits V and C are checked.

As described above, the address translation unit 75 can translate a virtual address to a physical address in a concentrated way to the memory access by the virtual address from the processor, and the control to the address translation is simplified.

By using different control systems for the access from the FCP 22 and the access from other processors, the access by other processors to the page which is being paged can be inhibited and the data security is achieved.

The operation for the missing page fault now will be explained.

When the requesting processor receives the page fault signal, the processor interrupts the task which it has been executing and initiates the FCP 22 to load the page containing the requested address to the main memory 10. The FCP 22 responds to the initiation signal to read out the corresponding page and issues a termination interruption signal at the end of readout. Since the necessary page has been rolled in the main memory 10 by this time, the processor resumes the interrupted task. During the interruption of the task, the processor executes other tasks.

Figure 13:
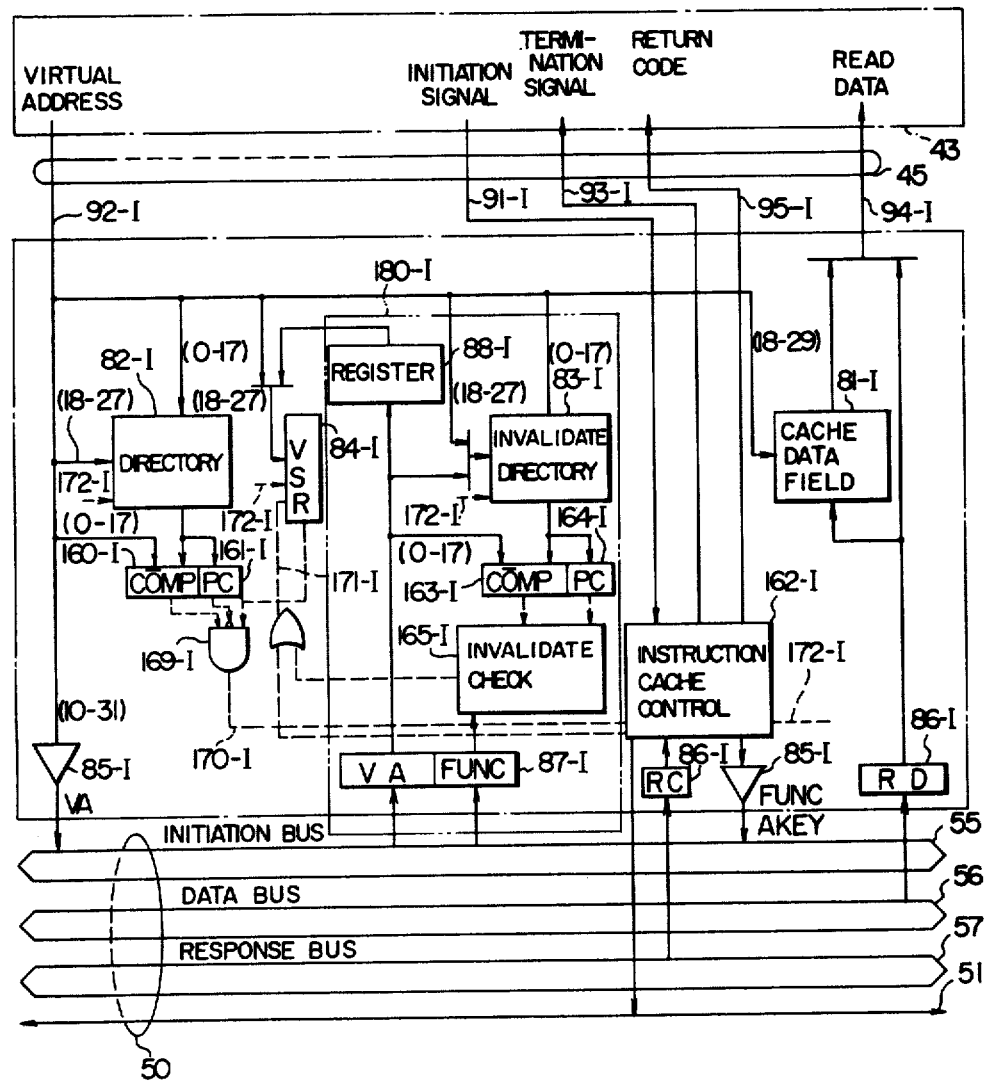
FIG. 13 shows a configuration of an instruction cache.

The instruction cache 41 and the data cache 42 now will be explained. FIG. 13 shows an exemplary configuration of the instruction cache 41. The data copied from the main memory 10 is on a cache data field 81-I, the addresses of that data are on a directory 82-I and an invalidate directory 83-I, and information indicating validity of the addresses is on a valid bit register 84-I. The contents of the directory 82-I and the invalidate directory 83-I are identical and they are separated to enhance the performance. The former is used to check whether the data accessed by the I unit 43 is in the cache data field 81-I or not and the latter is used to check the invalidation process for invalidating old data when the data written in the main memory 10 by another processor is read in the cache data field 81-I.

The operation of the instruction cache 41 now will be explained. Unlike the data cache 42, the instruction cache 41 does not carry out a write access.

Figure 14:
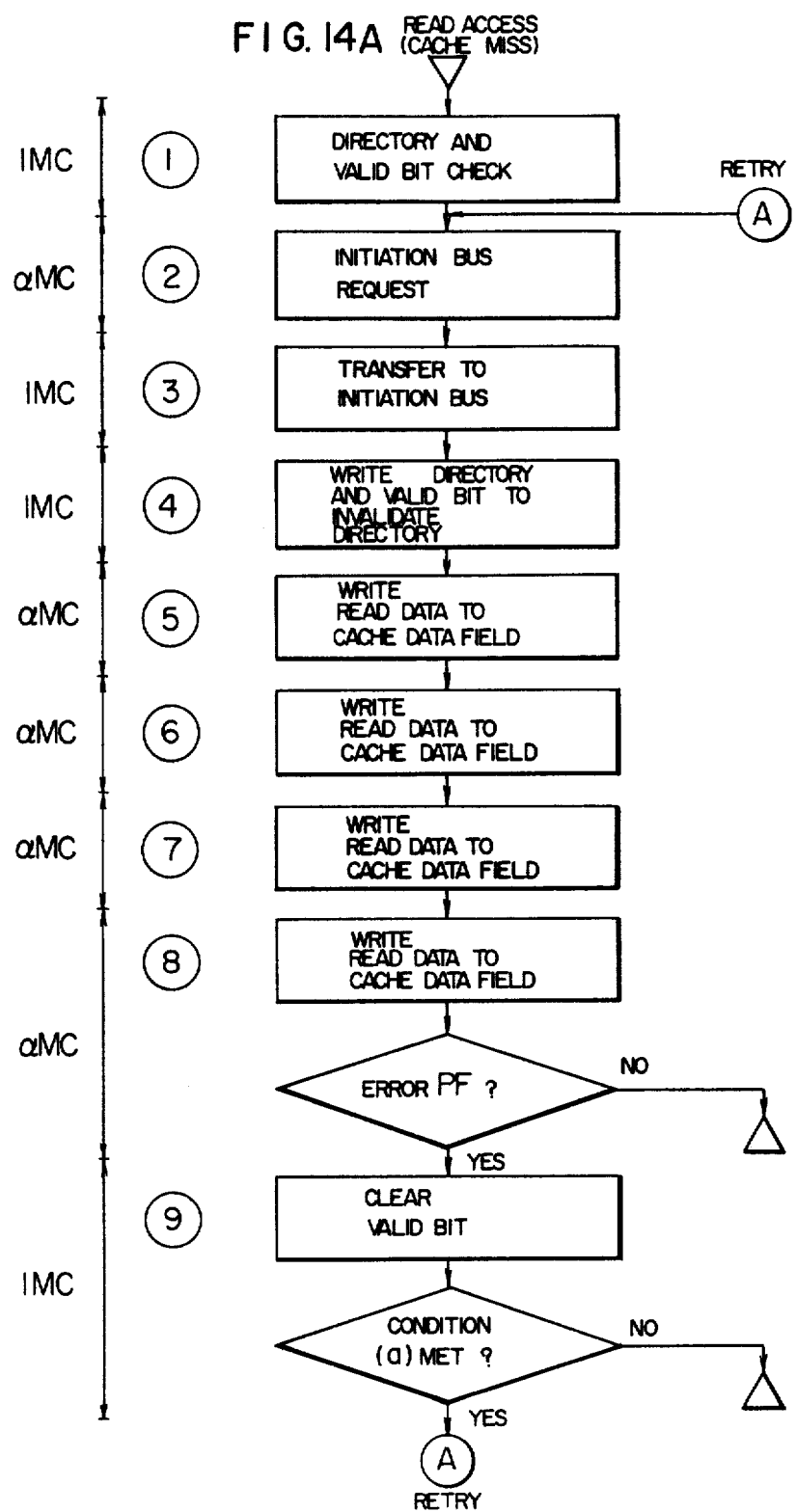
FIGS. 14A and 14B illustrate process flow for read access to the cache, FIG. 14B being placed immediately after FIG. 7.
Figure 15:
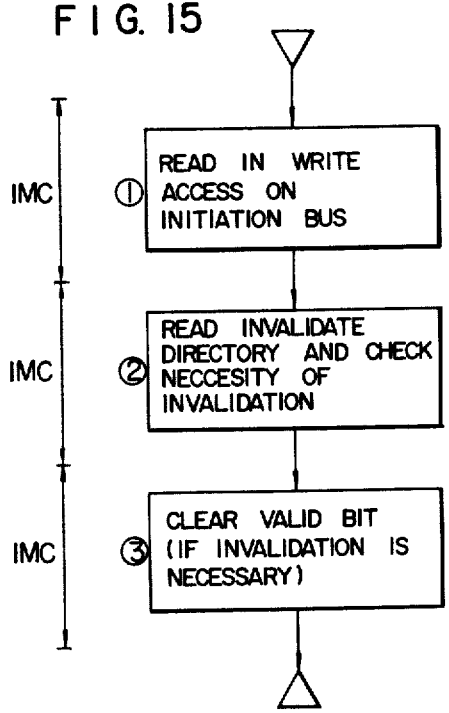
FIG. 15 illustrates process flow for cache invalidation.

FIG. 14 shows flow in the cache miss of the read access and FIG. 15 shows flow in the invalidation process.

(1) Read access (see FIG. 14)

① When an initiation signal 91-I is received from the I unit 43, the directory 82-I and the valid bit register 84-I are addressed by a portion of the virtual address 92-I, that is, bits (18–27) and the content of the directory 82-I and bits (0–17) of the virtual address 92-I are compared by a comparator 160-I. If the comparator 160-I indicates equality and no parity error is detected and the validity of the valid bit register 84-I is indicated, a cache hit signal 170-I is issued to an instruction cache controller 162-I through a gate 169-I so that the instruction cache controller 162-I transfers out the content of the cache data field 81-I accessed by the bits (18–29) of the virtual address to a read data bus 94-I and sends a termination signal 93-I back to the I unit 43.

② In the case of a cache miss, the instruction cache controller 162-I issues the initiation bus request 51.

③ If the initiation bus request 51 is accepted, a gate 85-I is opened to transfer the virtual address (VA), the type of access (FUNC) and the access key (AKEY) to the initiation bus 55. A bit indicating the instruction fetch is added to the access key (AKEY).

④ The bits (0–17) of the virtual address are written into the directory 82-I and the invalidate directory 83-I by a set signal 172-I, and the valid bit register 84-I is set. The reason for carrying out this process at this time will be described later.

⑤ When the read data (RD) is sent from the MCU 12 through the data bus 56 and the termination signal and the return code (RC) (information on the error occurred during the access and the page fault) are sent through the response bus 57, they are latched in the register 86-I. As described above in connection with the MCU 12, the data sent first is the one accessed by the I unit 43. Accordingly, when the return code (RC) indicates one of the following conditions (1) to (3), (that is, when the condition (b) shown in FIG. 14B is met), the termination signal 93-I, the read data 94-I and the return code 95-I are sent back to the I unit 43.

(1) No error
(2) Page fault
(3) Soft error (for example, protection error)

Since a hard error can, in many cases, be recovered by accessing the main memory 10 again, a retry is carried out for the hard error. In this case, the above signals are not sent back, but if the number of times of retry exceeds a predetermined number, that is, in the case of retry over, the above signals are sent back to report the error condition. The read data from the main memory 10 is then written into the cache data field 81-I.

⑥, ⑦, ⑧ The remainder of the read data sent from the MCU 12 is written into the cache data field 81-I. Since the termination signal 93-I has been sent back to the I unit 43 in the stage ⑤, the I unit 43 can carry out another operation during this period. In the stage ⑧, the occurrence of any error or page fault is checked, and if it has not occurred, the operation of the instruction cache 41 is stopped.

⑨ If an error or page fault has occurred, the instruction cache controller 162-I issues a valid bit clear signal 171 to the valid bit register 84-I which was set in the stage ④ to clear the valid bit register 84-I to inhibit the use of the corresponding data in the cache data field 81-I. If the hard error occurred in the stage ⑤ and the retry over is not present (that is, when the condition (a) of FIG. 14B is met), the process jumps to the stage ② to carry out the retry.

The read access process has thus far been explained. The cache (both the instruction cache and the data cache) need the invalidation process as described above. This process is explained below.

(2) Invalidation process (see FIG. 15)

① The virtual address (VA) and the type of access (FUNC) on the initiation bus 55 are loaded into the register 87.

② The invalidate directory 83-I is addressed by the bits (18–27) of the virtual address and the necessity of invalidation is checked by an invalidate check circuit 165-I. The bits (18–27) are loaded into the register 88-I.

③ When the invalidation is necessary, the corresponding valid bit 84-I is cleared by the address in the register 88-I. To this end, the invalidate check circuit 165-I issues a valid bit clear signal 171-I.

The case in which the invalidation is necessary is discussed in further detail. When the type of access (FUNC) read from the initiation bus 55 is the write access from another processor and one of the following conditions is met, the invalidation process is carried out.

(a) The content of the invalidation directory 83-I addressed by the bits (18–27) of the address in the register 87-I is equal to the bits (0–17) of the address when compared by a comparator 163-I.

(b) A parity checker 164-I detects a parity error when the invalidate directory 83-I is read.

(c) The invalidate directory 83-I is used by the JOBP 4. (Check is not possible in the stage ②.)

The reason why the address must be written into the directory 82-I and the invalidate directory 83-I and the valid bit register 84-I must be set in the stage ④ of the read access (1) is explained below.

Figure 16:
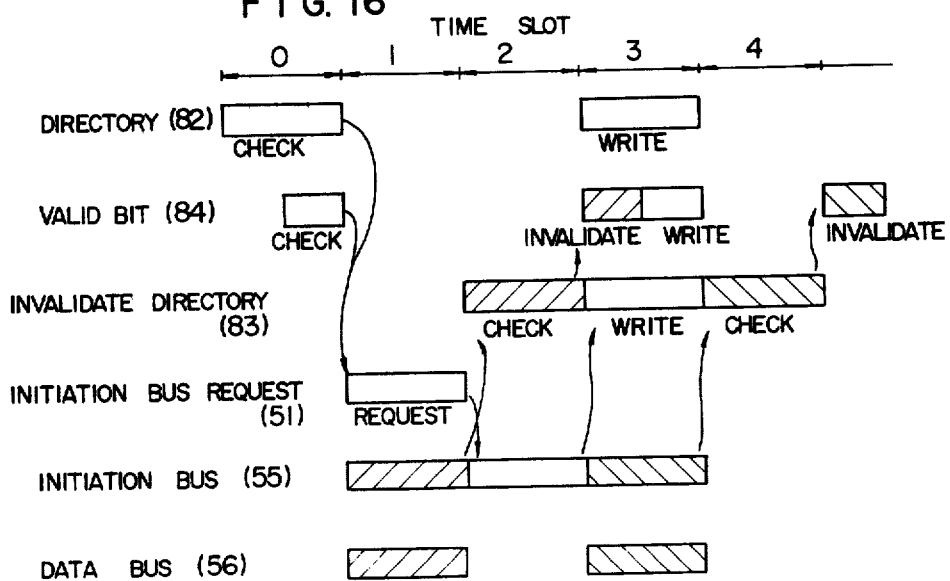
FIG. 16 shows timing for various points of the cache.

FIG. 16 shows a time chart for completing the invalidation process of the cache when the read access results in the cache miss and the main memory 10 is accessed to read data and when the main memory 10 is write-accessed by other processor. The invalidation process is shown by hatched blocks. For the write halves accesses on the initiation bus 55 and the data bus 56 in the time slots 1 and 3, respectively, the invalidate directory 83-I is checked in the time slots 2 and 4 and the valid bit register 84-I is cleared in first halves of the time slots 3 and 5. On the other hand, the read access which resulted in the cache miss transfers the address to the initiation bus 55 in the time slot 2. Accordingly, the main memory 10 is accessed after the write access on the initiation bus 55 in the time slot 1 and before the write access on the initiation bus in the time slot 3. Accordingly, in order to maintain the coincidence of the data in the cache and the main memory 10, the address of the read access which caused the cache miss must be written into the invalidate directory 83-I between the time slots 2 and 4 in which the write access checks the invalidate directory 83-I, and the valid bit register 84-I must be set between the time slots 3 and 5 in which the valid bit register 84-I is invalidated. Such control is needed because a plurality of memory accesses are simultaneously processed in the main memory 10.

In the illustrated configuration, since the address information is stored in two locations, the directory 82-I and the invalidate directory 83-I, only the invalidate directory 83-I is subject to the above restriction. Where the directory is at only one location, the directory is subject to the above restriction.

The data cache 42 is now explained. FIG. 17 shows an exemplary configuration of the data cache 42. An invalidate circuit 180-D is omitted because it is identical to the cache 41. The like numerals with different suffixes to those shown in FIG. 13 denote like or corresponding elements. In the instruction cache shown in FIG. 13, suffixes I are added while in the data cache of FIG. 17 suffixes D are added. A main difference from the instruction cache 41 resides in that the data cache must support the write access. In order to reduce the write access time, a common bus sending buffer 89-D is provided and in the write operation the virtual address 92-D, the write data 95-D and the control information 96-D are stored in the buffer 89-D and the termination signal 93-D is sent back to the E unit 44 to make it ready for the next process.

The operation of the data cache 42 now will be explained. The read access process is not explained here because it is identical for that in the cache 41.

(3) Write access (see FIG. 18)

① When the initiation signal 91-D is received from the E unit 44, the virtual address 92-D, the write data 95-D and the control information 96-D (type of access, access key and etc.) are stored in the common bus sending buffer 89-D and the termination signal 93-D is sent back to the E unit 44. The directory 82-D and the valid bit register 84-D are checked, and if the cache hit condition exists (signal 170-D is present), the data is written into the locations specified by the bits (18–27) of the virtual address of the cache data field 81.

② The data cache controller 162-D issues the initiation bus request 51 and the data bus request 52.

③ If both requests are accepted, the gate 85-D is opened to transfer the virtual address (VA), the type of access (FUNC) and the access key (AKEY) to the initiation bus 55 and the write data is transferred to the data bus 56.

④ When the MCU 12 sends the termination signal and the return code through the response bus 57, the register 86-D is latched. The return code is checked and if no error or page fault is present, the access is removed from the common bus sending buffer 89-D and the process competes. On the other hand, if the condition (a) shown in FIG. 14B is met, that is, the hard error exists and a retry over condition is not present, the process jumps to the stage ② to carry out the retry.

⑤ In the cases other than the case described above, the valid bit register 84-D is cleared by the address in the common bus sending buffer 89-D and the error and page fault condition is reported to the E unit 44. The valid bit register 84-D is cleared because in the case of protection error the data of the cache data field 81-D which should not have written was written in the stage ①.

The address used for the write initiation to the main memory 10 from the data cache 42 is also loaded into the register 87-D (included in the invalidate circuit 180-D) of the data cache through the initiation bus 55. Since it was issued from the data cache, the data cache controller 162-D sends a signal 173 to the invalidate circuit 180-D to inhibit the invalidation process. Since the instruction cache 41 does not carry out the write access, no signal corresponding to the signal 173-D is issued.

As described hereinabove, the present invention provides the data processing system having a plurality of processors at least one of which has a cache memory accessed with the virtual address, and an address translation unit which is shared by all of the processors.

What is claimed is:

1. A virtual storage data processing system comprising:
   (a) a main memory for storing data and instructions;
   (b) an external memory for storing data and instructions to be stored in said main memory;
   (c) a job processor for accessing said main memory with virtual addresses to access data and instructions stored therein;
   (d) a file processor connected to external memory for accessing said main memory with virtual addresses to transfer data and instructions between said main memory and said external memory;
   (e) a memory controller connected to said main memory and including an address translation unit which translates virtual addresses from said job processor and said file processor into physical addresses and means for controlling accesses to said main memory with the translated physical addresses;
   (f) a common bus for connecting said job processor and file processor with said memory controller; and
   (g) the address translation unit of said memory controller having means providing status flags indicating that said file processor is transferring a partial data block between said main memory and said external memory, and means responsive to said status flags being set for causing said address translation unit to allow an access from said file processor to said data block, while inhibiting an access from said job processor to said data block and for outputting a page fault signal indicating that said data block does not exist in said main memory.

2. A virtual storage data processing system according to claim 1 wherein said memory controller includes:
   (a) means having a first register for latching a virtual address transferred through the common bus from said file processor and said job processor,
   (b) said address translation unit having means for translating the virtual address latched in said first register to a physical address; and
   (c) means having a second register for storing the physical address from said address translation unit, for effecting sequential latching of the virtual address in said first register, including means for effecting address translation of the content of said first register and for storing the translated physical address in said second register and means for effecting initiation of said main memory by parallel readout of the content of said second register.

3. A virtual storage data processing system according to claim 1 wherein
   said common bus is shared by said job processor and file processor, each of said processors, when it accesses said main memory, using said common bus only in a transfer cycle of the virtual address and a receiving cycle of read data.

4. A virtual storage data processing system according to claim 1 wherein said job processor includes:
   (a) means having a cache memory for storing a partial copy of the data and instructions of said main memory and being accessible by a virtual address from said job processor, including:
      (i) an instruction cache for storing instructions from said main memory, and
      (ii) a data cache for storing data read from said main memory;
   (b) an instruction unit connected to said instruction cache for fetching and decoding an instruction word to be executed next from said instruction cache; and
   (c) an execution unit connected to said instruction unit and said data cache for reading necessary data from said data cache in accordance with an instruction from said instruction unit to execute the instruction.

5. A virtual storage data processing system according to claim 4 wherein at least one of said instruction cache and data cache includes:
   (a) a data unit for retaining a partial copy of said main memory;
   (b) a directory for retaining the virtual address of said main memory stored in said data unit;
   (c) a valid indication unit for indicating validity of said virtual address;
   (d) a latch register for latching the virtual address sent from said file processor;
   (e) compare means for comparing the virtual address latched in said latch register with the virtual address retained in said directory; and
      clear means for clearing said valid indication unit in accordance with the result of said comparison operation.

6. A virtual storage data processing system according to claim 5 further comprising:
   a cache memory controller including means responsive to the content of said valid indication unit, in a read access operation, for reading the corresponding data if it is in said cache memory and send it back to the processor that requests the access or for sending a virtual address to said address translation unit if said data is not in said cache memory, while in a write access operation, for writing the corresponding data in said cache memory if it is in said cache memory and for writing said corresponding data in said main memory, or if said corresponding data is not in said cache memory, for writing said corresponding data in said main memory.

7. A virtual storage data processing system according to claim 6 wherein said cache memory controller includes means responsive to absence of the requested data from the main memory for clearing said valid indication unit for the data corresponding to the virtual address, and means responsive to absence of the data from the main memory in the write access operation for clearing the valid indicating unit for the corresponding data if the write data is in said cache memory.

8. A virtual storage data processing system according to claim 6 wherein said cache memory controller includes means responsive to absence of the corresponding data from the cache memory in the read access operation for issuing a memory initiation signal to said main memory and for setting a valid indication unit for the corresponding data, and means responsive to a page fault signal being received from said address translation unit for clearing the corresponding valid indication unit, said memory initiation signal being issued when the page fault signal is received from said address translation unit after issuing a memory request signal.

9. A virtual storage data processing system according to claim 8 wherein said cache memory controller includes means for setting said valid indication unit in the case of the read access to said main memory due to the fact that the corresponding data is not in said cache memory, and for clearing said valid indication unit in the case of the write access to said main memory from said file processor, in the order of memory access requests onto said common bus.

* * * * *